United States Patent [19]
Klinkhamer

[11] Patent Number: 5,282,333
[45] Date of Patent: Feb. 1, 1994

[54] ICE FISHING HOLE COVER

[76] Inventor: Michael J. Klinkhamer, 2137 Geranium Ave. E., St. Paul, Minn. 55119

[21] Appl. No.: 81,138
[22] Filed: Jun. 25, 1993
[51] Int. Cl.⁵ .............................................. A01K 97/01
[52] U.S. Cl. ............................................................ 43/4
[58] Field of Search .............................. 43/4; 126/271.3

[56] References Cited

U.S. PATENT DOCUMENTS

| | | | |
|---|---|---|---|
| 2,618,091 | 11/1952 | Sheraski | 43/17 |
| 2,681,809 | 6/1954 | Hamill . | |
| 2,883,784 | 4/1959 | Obernolte | 43/4 |
| 3,025,852 | 3/1962 | Quilling | 43/4 |
| 3,030,122 | 4/1962 | Madera | 43/4 |
| 3,105,487 | 10/1963 | Anderson | 43/4 X |
| 3,170,458 | 2/1965 | Anderlie | 43/4 |
| 3,466,781 | 9/1969 | Nelson et al. | 43/4 |

Primary Examiner—Paula A. Bradley
Assistant Examiner—Jeanne M. Elpel
Attorney, Agent, or Firm—Thomas B. Tate

[57] ABSTRACT

An ice fishing hole cover comprising a box structure having two side panels, a front panel, a back panel, a hinged lid with a slit for a fishing line to pass through, and no bottom panel. A plurality of heating plates are attached to the underside of the lid, and a plurality of candleholders project from the interior sides of the side panels. The hole cover is made of transparent material and has a plurality of ventilation openings formed into the lid, front, back, and side panels.

5 Claims, 2 Drawing Sheets

ICE FISHING HOLE COVER

SUMMARY AND BACKGROUND OF THE INVENTION

In the sport of ice fishing, the fisherman cuts a circular hole into the ice down to the water level and drops his line into the water through the hole in order to catch fish. A difficulty which the ice fisherman faces is the fact that the ice tends to re-freeze quickly, thus reducing the diameter of the hole. Some ice fishermen attempt to slow the re-freezing process by pouring antifreeze or cooking oil into the hole. However, these methods pollute the water and are illegal in some states.

Several types of covers to protect the hole from refreezing are known in the prior art. Most of these devices use solar energy to heat the hole. That method has the limitations that it cannot be used at night and also has reduced effectiveness on the cloudy days which are common in winter in northern states.

The present invention is a hole cover which uses candles as an internal heat source and which has ventilation openings on the lid, front, back, and sides. The primary object of the invention is to keep the hole ice-free while fishing. Additional advantages of the invention are that the candles provide light for fishing after dark, and the fisherman can warm his hands by holding them above the ventilation holes in the lid. Because the hole cover is made of transparent material such as plexiglass, an additional advantage is that the fisherman can observe the fishing hole, to see if a fish has bitten, while sitting in his vehicle or fish house.

DESCRIPTION OF THE INVENTION

Figure 1:
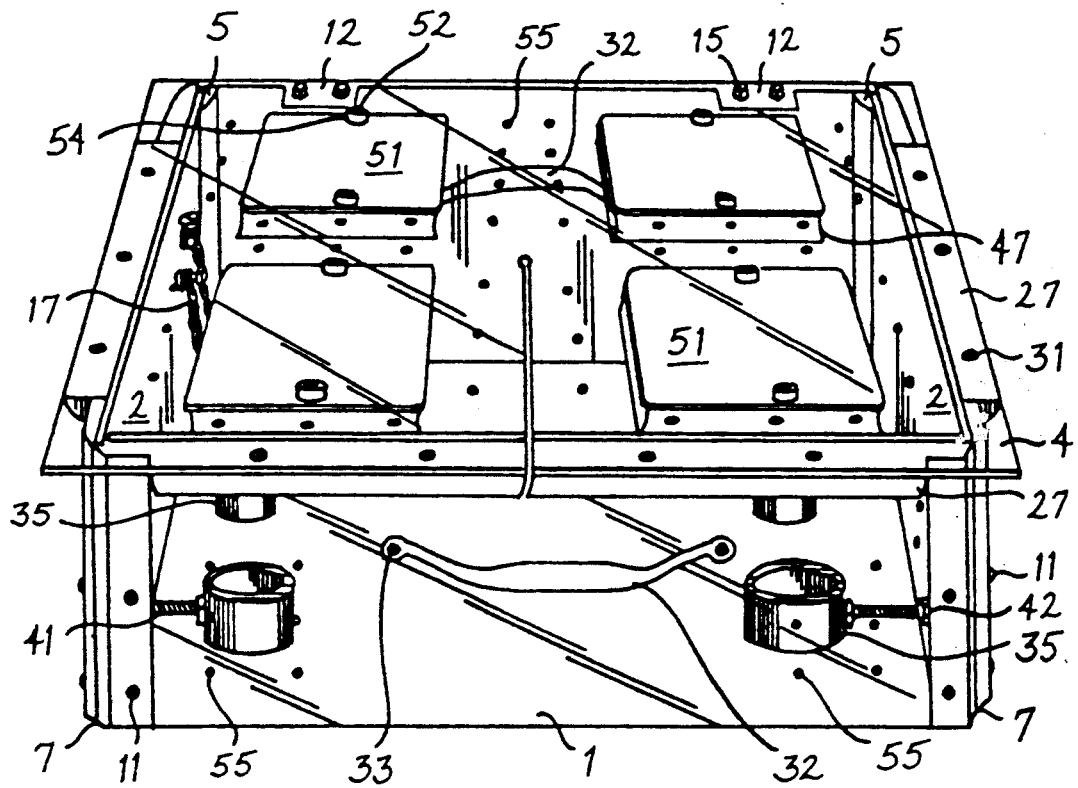
FIG. 1 is a perspective view of the front and top of the invention with the lid closed. Because the panels are transparent, portions of the side and back panels and portions of the internal structures are visible through the front panel and lid.
Figure 2:
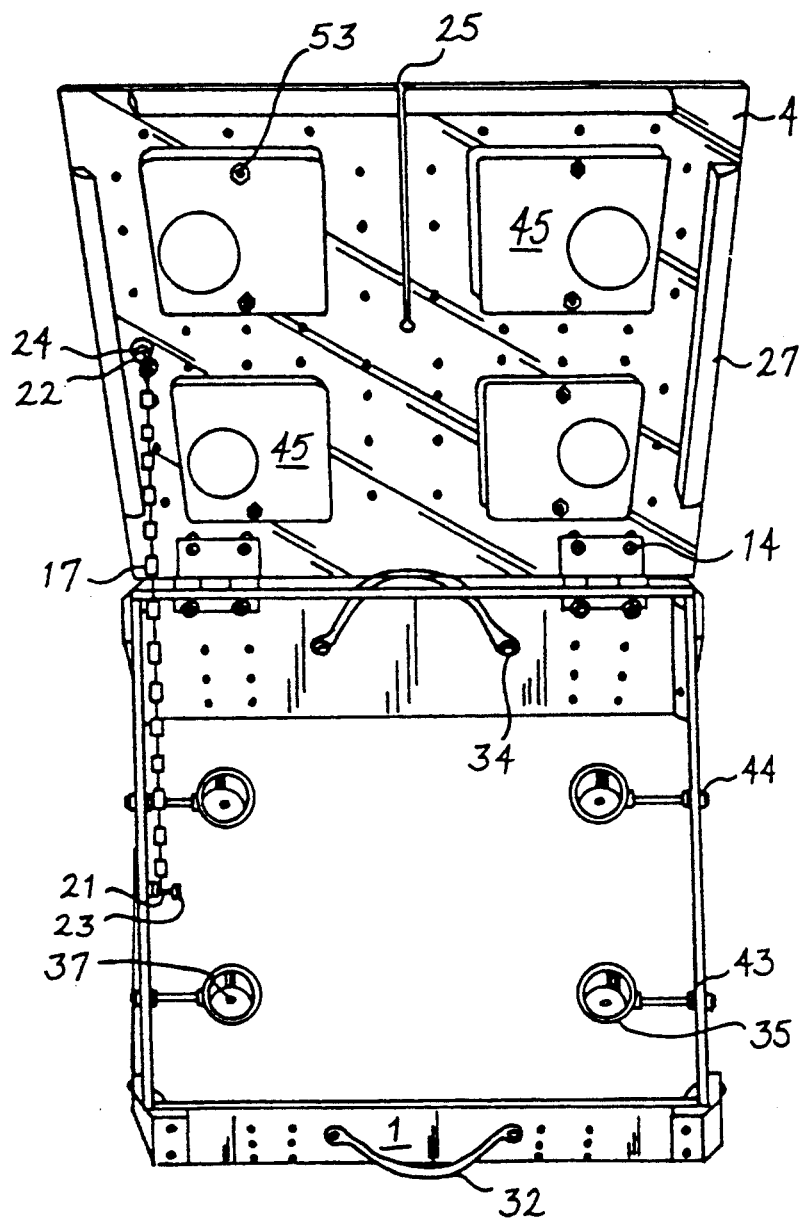
FIG. 2 is a top perspective view with the lid open to reveal the internal structures.

The ice fishing hole cover is a generally rectangular box-like structure, made of clear plexiglass, and of sufficient size (approximately one foot long by one foot wide by seven inches high) to completely cover a typical ice fishing hole when the cover is placed into position on the surface of the ice surrounding the fishing hole.

The hole cover has a front panel 1, two side panels 2, a back panel 3, and a lid 4. There is no bottom panel, thus allowing the fisherman access to the water underneath the fishing hole. The side panels 2 meet the front panel 1 and back panel 3 at right angles and are reinforced at each corner by a wooden inside corner brace 5, and are held together by outside corner trim 7 which is attached to the brace 5 by Phillips screws 11 which penetrate through the trim 7 and the respective plexiglass panel into the brace 5. The lid 4 is opened and closed by means of hinges 12 which fit under the lid 4 and over the back panel 3 and are held in position by bolts 14 and lock nuts 15. The lid 4 is held in the open position by a chain 17 extending from the lid 4 to one of the side panels 2 and attached at either end to a bolt 21 which penetrates its respective panel and is held in position by means of a lock nut 22 and washer 24 positioned against the inside surface of the respective panel, and by a standard nut 23 at the opposite end of bolt 21.

A slit 25 runs vertically from the front edge to the center of the lid 4. The fisherman casts his line into the water while the lid 4 is open, and then the lid 4 can be closed while the line remains in position by passing the line through the slit 25 while the lid 4 is being closed. When he catches a fish, he can remove it from the water by opening the lid 4, passing the line through the slit 25 while leaving the hole cover in position.

The lid 4 slightly overhangs the side panels 2 and the front panel 1. To prevent drafts, wooden wind deflectors 27 are affixed to the underside of the overhanging part of lid 4 and are held in position by Phillips screws 31. Along each of the side panels 2 a single wind deflector 27 extends the length from one piece of corner trim 7 to the next. Along the front panel 1, there are two wind deflectors 27, each extending from the slit 25 to the adjacent corner trim 7.

The front panel 1 and back panel 3 are each provided with a steel handle 32 to make the hole cover more easily portable. Each handle 32 is attached to its respective panel by means of bolts 33 and lock nuts 34.

The heating mechanism used to maintain the fishing hole ice-free is as follows: four steel candleholders 35 are positioned on the inside of the hole cover, two each attached to and projecting inwardly from each of the side panels 2. Each candleholder 35 can hold one standard five inch long fisherman's candle which will burn for approximately ten hours. Each of the candleholders 35 has an opening 37 at the bottom to allow removal of an unused candle. Each candleholder 35 is held in position by a bolt 41 with a lock nut 42 and lock washers 43 alongside the candleholders 35 on the inside surface of side panel 2, and a standard nut 44 on the outside surface of side panel 2. Four steel heating plates 45, one positioned directly above each candleholder 35, are affixed to the underside of lid 4. Each heating pad 45 has a layer of foam insulation 47 in the center and a cover layer 51 which is attached to the underside of lid 4 and which may be decorated with a wildlife print. Each heating pad 45 is held in position by a pair of bolts 52 and nuts 53. Each bolt 52 is countersunk into a wooden insulator 54. A plurality of ventilation holes 55, each approximately one-fourth of an inch in diameter, are provided. The front panel 1, back panel 3, and side panels 2 each have twelve ventilation holes 55, which provide oxygen for the candles so that they burn brightly; this functions as a chimney effect. The lid 4 has forty-four ventilation holes 55, which not only provide oxygen for the candles to burn but also rapidly dissipate the condensation which forms when the candles are first lighted and allow heat to escape through the lid 4 so that the fisherman can warm his hands by holding them above the holes 55. The number and configuration of the ventilation holes 55 can vary, but the arrangement shown and described herein provides the optimum results.

To use the hole cover to keep the fishing hole ice-free, the fisherman lifts the lid 4, lights as many of the four candles as are needed, and closes the lid 4.

I claim:
1. An ice fishing hole cover comprising:
   a generally rectangular box structure having a front panel, two side panels, a back panel, and a lid attached to said back panel by hinge means, said structure being open at the bottom;
   a plurality of insulated heating plates affixed to the underside of said lid;

a plurality of candleholders attached to and projecting inwardly from said side panels;

a plurality of ventilation openings formed into said lid and said front, back, and side panels;

and a slit formed into said lid, said slit being of sufficient width to enable a fishing line to be passed therethrough.

2. The invention of claim 1 wherein handles are attached to said front and back panels.

3. The invention of claim 1 wherein wind deflectors are attached to the underside of said lid.

4. The invention of claim 1 wherein said lid is provided with chain means extending to and attached to one of said side panels.

5. The invention of claim 1 wherein said lid, front and back panels, and side panels are comprised of a transparent material such as plexiglass.

* * * * *